United States Patent [19]

Ferguson et al.

[11] 4,130,180
[45] Dec. 19, 1978

[54] TREE CLIMBING PLATFORM

[76] Inventors: James B. Ferguson, Rte. 3, Box 14A, Falkville, Ala. 35622; Ernie B. Ferguson, 1156 Crestfield La., Hixson, Tenn. 37343; Clarence E. Ferguson, Rte. 2, Box 241A, Hartselle, Ala. 35640

[21] Appl. No.: 762,243

[22] Filed: Jan. 25, 1977

[51] Int. Cl.² .................... A47C 9/10; A63B 27/00
[52] U.S. Cl. ............................................. 182/187
[58] Field of Search ............... 182/187, 61, 62, 155, 182/92; 248/216.1, 222.2, 230, 246

[56] References Cited

U.S. PATENT DOCUMENTS

| 536,265 | 3/1895 | Bullock | 182/62 |
|---|---|---|---|
| 605,370 | 6/1898 | Adams | 182/155 |
| 1,098,945 | 6/1914 | Frederick | 182/187 |
| 2,265,730 | 12/1941 | Hall | 182/61 |
| 2,512,174 | 6/1950 | Roeder | 182/187 |
| 3,338,332 | 8/1967 | Brantly | 182/187 |
| 3,460,649 | 8/1969 | Baker | 182/187 |
| 3,885,649 | 5/1975 | Damron | 182/187 |
| 3,944,022 | 3/1976 | Ming | 182/187 |
| 3,991,853 | 11/1976 | Bridges | 182/187 |

FOREIGN PATENT DOCUMENTS 4992 of 1888 United Kingdom .................... 182/62

Primary Examiner—Reinaldo P. Machado
Attorney, Agent, or Firm—Woodford R. Thompson, Jr.

[57] ABSTRACT

A tree climbing platform embodying a base plate having side members projecting beyond an end thereof and disposed to extend alongside opposite sides of a tree with said one end of the base plate spaced from the adjacent side of the tree and the other end thereof extending away from the tree. A first blade carried by the side members bites into the opposite side of the tree from the side thereof nearest the base plate. A frame member is connected at one end to said other end of the base plate and extends inwardly beneath the base plate. A second blade at the inner end of the frame member bites into the side of a tree opposite the side thereof engaged by the first blade. Means is carried by the base plate for detachably attaching the base plate to the feet of a person standing thereon.

10 Claims, 6 Drawing Figures

TREE CLIMBING PLATFORM

BACKGROUND OF THE INVENTION

This invention relates to a tree climbing platform which is particularly adapted for use by hunters, such as deer hunters, which use the platform to climb a tree and then support the hunter at an elevation above the ground.

Heretofore in the art to which our invention relates, many devices have been proposed for climbing trees and supporting hunters from the tree, such as the tree climbing devices shown in the Baker U.S. Pat. No. 3,856,111 and the Dye U.S. Pat. No. 3,955,645. Such prior art devices have horizontal platforms with the inner ends thereof biting into the adjacent side of a tree to thus secure the platform to the tree. Where the inner edge of the platform engages the tree, excessive pressures are placed on the portion of the platform which engages the tree whereby the platform is damaged or is split due to the heavy weight of the hunter supported thereon. This is especially true in view of the fact that the platform of such a device defines an elongated lever with the fulcrum point being at the point of contact with the tree and the force applied being the weight of the hunter adjacent the free or outer end of the platform. On the other hand, when the hunter stands on the platform adjacent the tree, a downward force in a vertical direction is applied adjacent the tree engaging portion of the platform whereby the inner end of the platform would have a tendency to rotate or slide downwardly relative to the tree since such a force would not be in a direction to cause the tree engaging edge to bite into the tree.

Another disadvantage with prior art tree climbing devices has been the fact that such devices have supporting structures which extend upwardly above the supporting platform in position to interfere with movement of the hunter and also interferes with the positions that the hunter can sit on the platform. Also, prior tree climbing devices have been complicated in structure and require the assembly or disassembly of many parts as the platform is assembled for climbing and is then disassembled for removal from the tree.

SUMMARY OF THE INVENTION

In accordance with our invention, we provide a base plate having side members projecting beyond one end of the base plate in position to extend along opposite sides of the tree with the adjacent end of the base plate being spaced from the adjacent side of the tree. Accordingly, the edge of the platform adjacent the tree does not engage or bite into the tree. The other end of the base plate extends outwardly away from the tree and is connected to one end of a frame member with the other end of the frame member extending inwardly beneath the base plate. A first transverse blade carried by the side members engages and bites into the opposite side of the tree from the side thereof nearest the base plate. A second transverse blade carried by the inner end of the frame member bites into the side of the tree opposite the side thereof engaged by the first transverse blade whereby downward force on the base plate is imparted to the frame member whereby the blade carried by the frame member is forced into engagement with the tree. At the same time, the blade member carried by the side members is forced in a direction to bite into the opposite side of the tree from the side thereof nearest the base plate. Accordingly, the edge of the base plate adjacent the tree does not engage the tree whereby all of the force is transferred downwardly through the frame member to the subjacent blade carried by the inner end of the frame member and at the same time force is applied in a direction to move the blade member carried by the projecting side members into engagement with the opposite side of the tree.

DESCRIPTION OF THE DRAWINGS

A tree climbing platform embodying features of our invention is illustrated in the accompanying drawings, forming a part of this application in which.

DETAILED DESCRIPTION

Figure 1:
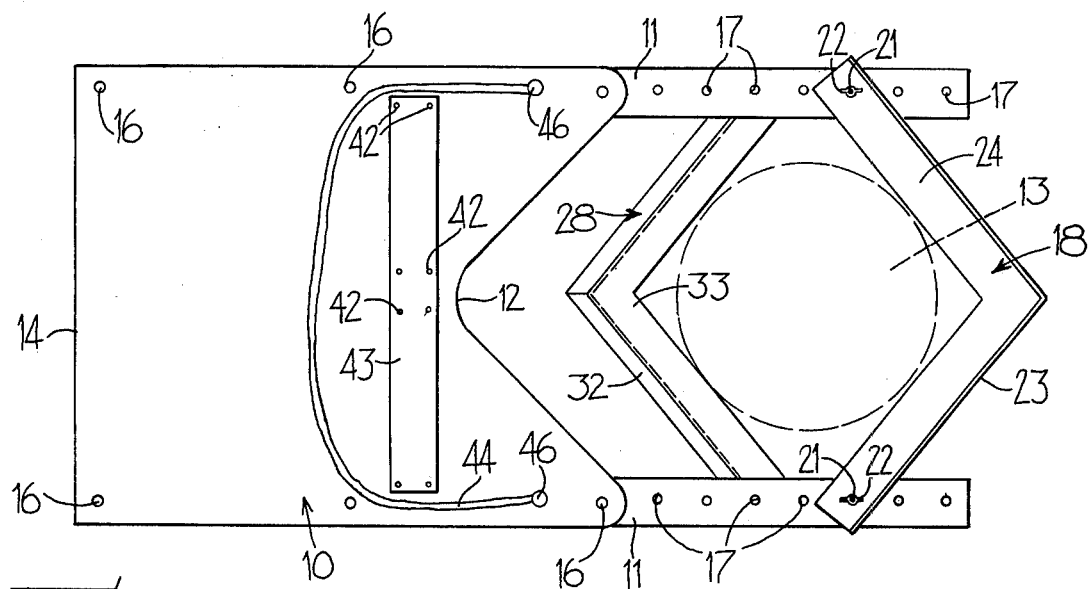
FIG. 1 is a top plan view showing our improved platform in the operative position relative to a tree, the trunk of the tree being indicated in dotted lines.
Figure 2:
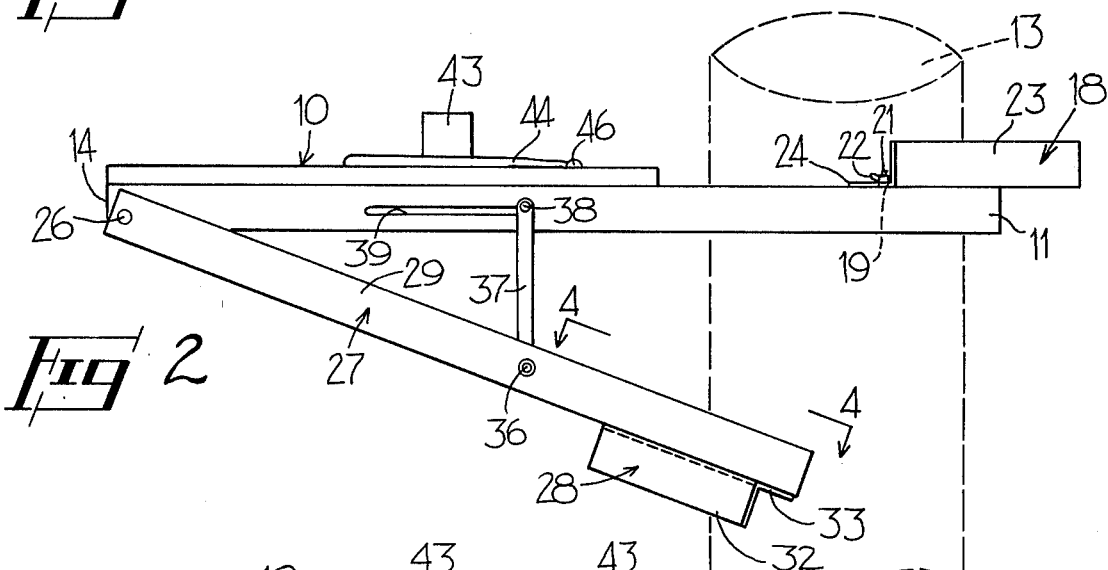
FIG. 2 is a side elevational view of the tree climbing platform, the trunk of the tree being shown in dotted lines.
Figure 6:
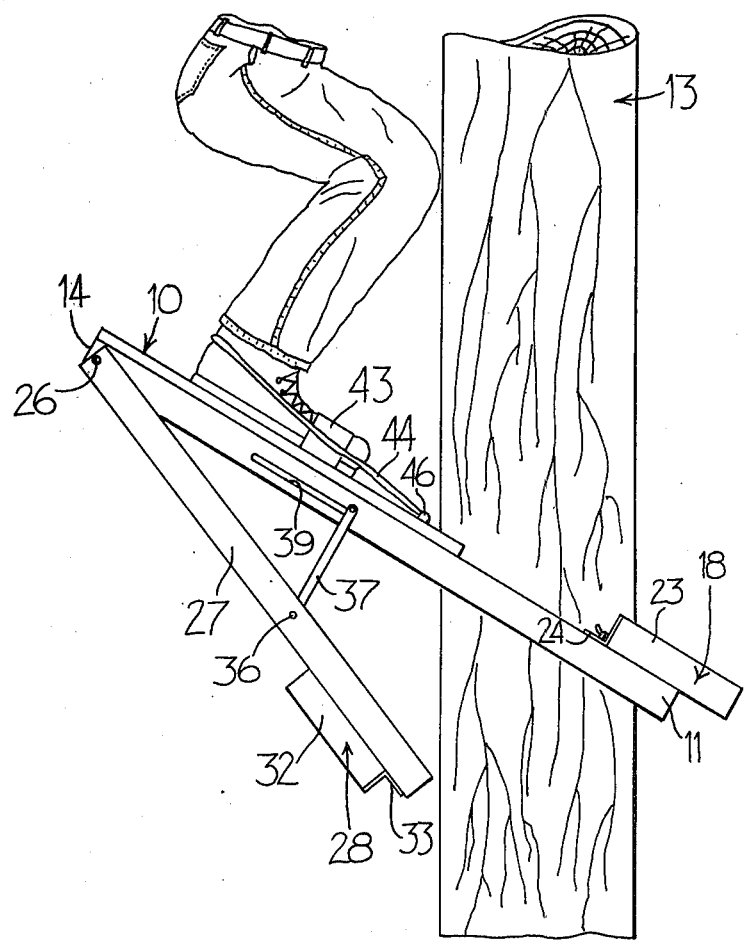

Referring now to the drawings for a better understanding of our invention, our improved tree climbing platform comprises a base plate 10 which may be formed of a suitable material, such as plywood. Secured to each side of the base plate 10 are longitudinally extending side members 11, which may be in the form of lightweight metal angle members, such as aluminum or the like. As shown in FIGS. 1, 2 and 6, the side members 11 project beyond the inner end 12 of the base plate 10 in position to extend alongside opposite sides of a tree trunk 13, indicated in dotted lines in FIGS. 1 and 2 and in solid lines in FIG. 6. As clearly shown in FIG. 1, the inner end 12 of the base plate 10 is concave or generally V-shaped, as viewed in plan, whereby the inner end 12 is spaced from the adjacent side of the tree 13. The other end 14 of the base plate 10 extends away from the tree 13, as shown. As shown in FIG. 1, the base plate 10 is secured to the side members 11 by suitable means, such as retaining screws 16.

As shown in FIG. 1, the side members 11 are each provided with longitudinally spaced openings 17. Extending transversely of the projecting ends of the side members 11, as shown in FIG. 1, is a transverse blade-like member 18 having suitable openings 19 therethrough for receiving bolts 21 having wing nuts 22. The openings 19 are adapted to move into alignment with an oppositely disposed pair of the longitudinally spaced openings 17, as shown in FIG. 1, whereby the bolts 21 extend through the openings 17 and 19 to thus secure the transvese blade 18 in selected positions along the projecting ends of the side members 11. Accordingly, the transverse blade 18 may be moved to selected positions to accommodate trees having trunks of various diameters. As shown in FIG. 2, the transverse blade 18 may be in the form of an angle member having a vertical flange 23 and a horizontal flange 24. As shown in FIG. 1, the transverse blade 18 is generally V-shaped, as viewed in plan, whereby the inner edges of the horizontal flanges 24 bite into the opposite side of the tree 13 from the side thereof nearest the end 12 of the base plate 10.

Figure 3:
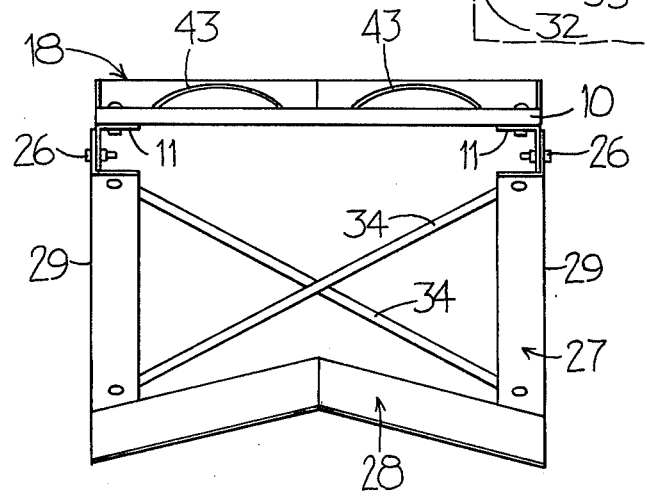
FIG. 3 is an end elevational view taken from the left side of FIG. 2, the trunk of the tree being omitted, for the sake of clarity.
Figure 4:
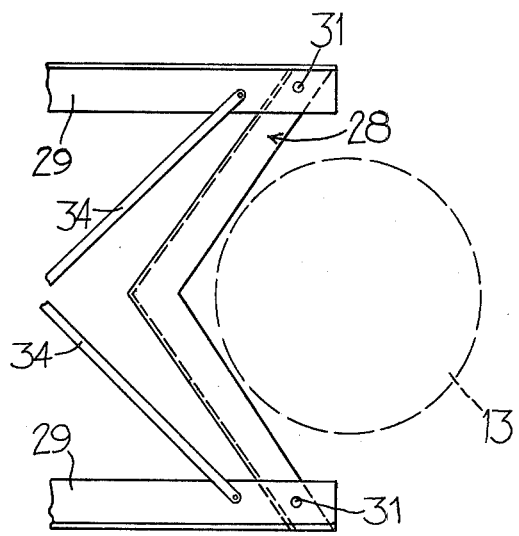
FIG. 4 is a fragmental view taken generally along the line 4—4 of FIG. 2.

Pivotally connected to the base plate 10, adjacent the end 14 thereof, by suitable retaining bolts 26 is a downwardly and inwardly extending frame member 27 which extends beneath the base plate 10, as shown in FIGS. 2 and 6. Rigidly secured to the inner end of the frame member 27 is a transverse blade 28 which is also generally V-shaped, as shown in FIG. 4. The frame member 27 comprises a pair of side members 29 which are secured at their inner ends by suitable retaining bolts 31 to the end portions of the transverse blade 28, as shown in FIG. 4. The transverse blade 28 is also preferably in the form of angle members having vertical flanges 32 and generally horizontal flanges 33. The inner edges of the horizontal flanges 33 are adapted to bite into the side of the tree 13 opposite the side thereof engaged by the transverse blade 18, as clearly shown in FIGS. 1 and 2. To add strength to the frame member 27, suitable cross braces 34 may be secured to the side members 29, as shown in FIGS. 3 and 4.

Figure 5:
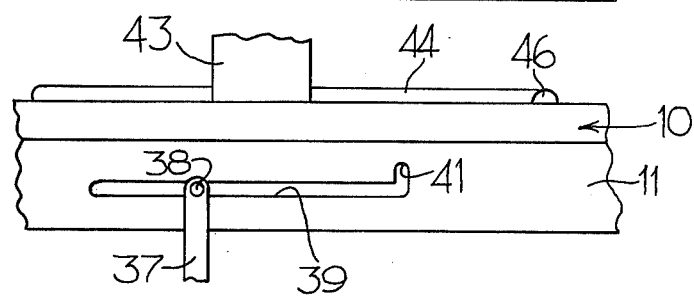
FIG. 5 is an enlarged, fragmental view showing the means for retaining the base plate and the frame member pivotally connected thereto selectively in the operative and inoperative positions, parts being broken away; and, FIG. 6 is a side elevational view, partly broken away, showing the outer end of the tree climbing platform in an elevated position, which is assumed during the climbing operation.

By pivotally connecting the frame member 27 adjacent the end 14 of the base plate 10, the frame member is adapted to move selectively to the operative position shown in FIGS. 2 and 6 and to an inoperative position alongside the side members 11. That is, while in the inoperative position, the side members 29 of the frame member 27 would lie alongside the side members 11. On the other hand, in the operative position, the side members 29 of the frame member 27 would extend downwardly and away from the base plate 10 to the position shown in FIGS. 2 and 6. To retain the frame member 27 in the operative position, each side member 27 is pivotally connected by a transverse pin 36 to one end of an elongated arm 37. The other end of the arm 37 carries a transverse pin 38 which is adapted to ride in an elongated slot 39 provided in each side member 11. As shown in FIG. 5, an offset recess 41 is provided at the inner end of the elongated slot 39 for receiving the transverse pin 38. Accordingly, as weight is placed on the base plate 10, the force is transmitted through the frame member 27 to thus cause the transverse blade 28 to bite into the adjacent side of the tree 13. At the same time the weight on the base plate 10 causes the pin 38 to move upwardly in the recess 41 to thus lock the frame member 27 in the operative position.

Secured to the upper surface of the base plate 10 by suitable retaining members 42 is an elongated foot engaging member 43 which may be in the form of a flexible strap. Preferably, the ends of the foot engaging member 43 are secured to the base plate 10 and an intermediate portion is also secured to the base plate 10 by the retaining members 42 to provide a pair of foot engaging members 43, as clearly shown in FIG. 3. To further aid in securing the foot of the user in place, an elongated resilient member 44 is secured to opposite sides of the base plate 10 by suitable retaining elements 46, as shown in FIG. 1. The resilient member 44 is of a length of pass around the rear portion of the feet of a user, as clearly shown in FIG. 6 whereby the feet are firmly anchored in the foot engaging members 43 during the climbing operation.

From the foregoing description, the operation of our improved tree climbing platform will be readily understood. The person using the climbing platform removes at least one of the bolts 21 whereby the transverse blade 18 may be moved to a position for the tree 13 to move between the projecting side members 11 to the position shown in FIG. 1. The transverse blade 18 is then secured in place by the bolts 21 and wing nuts 22 with the adjacent end 12 of the base plate 10 being in spaced relation to the tree 13, as shown. To accommodate trees 13 of different sizes, the bolts 21 are moved to selected ones of the spaced apart openings 17 and the wing nuts 22 are then secured in place.

To climb a tree, the frame member 27 is moved to the operative position shown in FIGS. 2 and 6 whereby the frame member 27 extends downwardly and away from the base member 10. The hunter stands on top of the base plate 10 with his feet positioned inwardly of the strap members 43. The resilient member 44 is passed around the back of the feet of the hunter, as shown in FIG. 6, whereby the feet are secured in place on the plate member 10. The hunter then grabs the trunk of the tree with his hands at an elevation above the tree climbing platform and then pulls his legs upwardly, as shown in FIG. 6. In this position, the transverse blade 28 disengages the tree 13 thus causing the device to move to the position shown in FIG. 6 with the end 14 of the base plate 10 elevated relative to the end 12. Upon pressing downwardly on the base plate 10, the transverse blade 28 then bites into the adjacent side of the tree 13 thus securing the transverse blade 28 to the tree 13 at this location. The hunter then lowers his feet from the position shown in FIG. 6 whereupon the base plate 10 moves to a horizontal position which causes the transverse blade 18 to move upwardly to a higher elevation. This procedure is repeated as the hunter climbs the tree. Upon reaching the desired elevation, the base plate 10 remains in the operative, horizontal position shown in FIG. 2 whereby the transverse blades 18 and 28 bite into opposite sides of the tree 13 to thus secure the tree climbing platform to the tree 13.

To move down the tree, the hunter merely raises his feet to the position shown in FIG. 6 whereby the transverse blade 28 disengages the tree 13. The hunter then lowers his feet to move the lower end of the frame member 27 to a lower elevation whereby the transverse blade 28 then engages the tree at a lower elevation as the base plate 10 moves toward a horizontal position. The hunter then grasps the tree trunk 13 at a lower elevation whereby the hunter again lowers the platform to another lower elevation. This step-by-step procedure is repeated until the climbing platform and the hunter reach the ground.

From the foregoing, it will be seen that we have devised an improved tree climbing platform. By providing a tree climbing platform whereby all of the weight of the hunter is applied directly to the transverse blade 28 rather than to an inner edge of the supporting platform, we not only prevent damage to the supporting platform but provide a sturdy and stable structure. This is especially true in view of the fact that the downward force exerted on the base plate 10 is transferred through the frame member 27 to the transverse blade 28 rather than being transferred from the edge 12 of the base plate 10 to the adjacent side of the tree. Also, by pivotally connecting the frame member 27 to the outer end 14 of the base plate 10, the downward force on the base plate 10 always causes the transverse blade 28 to bite into the adjacent side of the tree, thus preventing disengagement of the transverse blade 28 from the tree while the platform is in operative position. Furthermore, by providing the downwardly and inwardly extending frame member 27, there are no structural members projecting above the base plate 10 whereby the hunter may move freely relative to the upper surface of the base plate 10 without engaging such structural members. Accordingly, the hunter may sit toward the front of the base plate 10 or may sit at either side thereof without contacting upstanding structural members. Furthermore, by providing a tree climbing platform which is extremely simple of construction, the platform may be assembled and disassembled with a minimum of effort and at the same time the platform is positively anchored to the tree when in the operative position.

While we have shown our invention in but one form, it will be obvious to those skilled in the art that it is not so limited, but is susceptible of various changes and modifications without departing from the spirit thereof.

What is claimed is:

1. A tree climbing platform comprising:
   (a) a horizontal base plate having rigid side members projecting beyond one end thereof in position to extend alongside opposite sides of a tree with said one end of said base plate being out of operative engagement with and spaced from the adjacent side of said tree so that no force is transmitted from said one end of said base plate to the side of said tree adjacent thereto and the other end of said base plate extending away from said tree,
   (b) a first transverse blade carried by said rigid side members in position to bite into the opposite side of a tree from the side thereof nearest said one end of said base plate,
   (c) a frame member pivotally connected at one end thereof to said other end of said base plate in spaced relation to said one end of said base plate and disposed to extend downwardly and inwardly beneath said base plate,
   (d) a second transverse blade carried by the inner end of said frame member in position to bite into the side of a tree opposite the side thereof engaged by said first transverse blade,
   (e) means carried by said base plate for detachably attaching said base plate to the feet of a person standing thereon, and
   (f) locking means operatively connecting said frame member to said base plate and adapted to retain said inner end of said frame member and said base plate at fixed positions relative to each other.

2. A tree climbing platform as defined in claim 1 in which said first and second transverse blades are generally V-shaped as viewed in plan.

3. A tree climbing platform as defined in claim 1 in which means is provided for detachably connecting said first transverse blade to said side members at selected longitudinal positions.

4. A tree climbing platform as defined in claim 3 in which said means for detachably connecting said first transverse blade to said side members comprises openings through end portions of said first transverse blade adapted to move into alignment with openings in said side members and retaining members passing through said openings securing said first transverse blade to said side members.

5. A tree climbing platform as defined in claim 4 in which a plurality of said openings are provided in each said side member in longitudinally spaced relation to each other for receiving said retaining members so that said first transverse blade may be secured to said side members at selected positions.

6. A tree climbing platform as defined in claim 1 in which said one end of said base plate is recessed inwardly toward the center thereof.

7. A tree climbing platform as defined in claim 1 in which said inner end of said frame member is movable selectively to an inoperative position alongside said base plate and to an operative position downwardly and away from said base plate.

8. A tree climbing platform as defined in claim 7 in which said locking means operatively connecting said frame member to said base plate is adapted to lock said frame member in said operative position upon movement of said frame member away from said base plate to said operative position.

9. A tree climbing platform as defined in claim 8 in which said locking means comprises:
   (a) at least one arm pivotally connected at one end to said frame member,
   (b) a transverse pin-like member carried by the other end of said arm,
   (c) there being an elongated slot in the side member of said base plate disposed to receive said pin-like member, and
   (d) an offset recess in said elongated slot disposed to receive said pin-like member in response to movement of said frame member to said operative position.

10. A tree climbing platform as defined in claim 1 in which at least one foot engaging member is carried by said base plate in position to overlie the feet of a person standing on said base plate.

* * * * *

UNITED STATES PATENT OFFICE
CERTIFICATE OF CORRECTION

Patent No. 4,130,180          Dated December 19, 1978

Inventor(s)   James B. Ferguson et al.

It is certified that error appears in the above-identified patent and that said Letters Patent are hereby corrected as shown below:

On the Title Page insert -- Orbin M. Cole, Rte. 3, Box 19,

Sommerville, Ala. 35670 --.

*Signed and Sealed this*

*Seventeenth* Day of *April 1979*

[SEAL]

Attest:

RUTH C. MASON
*Attesting Officer*

DONALD W. BANNER
*Commissioner of Patents and Trademarks*